United States Patent
Hyun et al.

(10) Patent No.: US 10,492,652 B2
(45) Date of Patent: Dec. 3, 2019

(54) DUST COLLECTOR FOR VACUUM CLEANER

(71) Applicant: LG ELECTRONICS INC., Seoul (KR)

(72) Inventors: Kietak Hyun, Seoul (KR); Seungyeop Lee, Seoul (KR); Hyukjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 156 days.

(21) Appl. No.: 15/542,911

(22) PCT Filed: Jan. 19, 2016

(86) PCT No.: PCT/KR2016/000515
§ 371 (c)(1),
(2) Date: Jul. 11, 2017

(87) PCT Pub. No.: WO2016/117893
PCT Pub. Date: Jul. 28, 2016

(65) Prior Publication Data
US 2018/0000302 A1    Jan. 4, 2018

(30) Foreign Application Priority Data

Jan. 19, 2015 (KR) .................. 10-2015-0008868

(51) Int. Cl.
| | | |
|---|---|---|
| *B01D 50/00* | (2006.01) | |
| *A47L 9/16* | (2006.01) | |
| *A47L 9/10* | (2006.01) | |
| *A47L 9/12* | (2006.01) | |

(Continued)

(52) U.S. Cl.
CPC ............ *A47L 9/1608* (2013.01); *A47L 9/108* (2013.01); *A47L 9/125* (2013.01); *A47L 9/165* (2013.01);
(Continued)

(58) Field of Classification Search
CPC ........ A47L 9/1608; A47L 9/125; A47L 9/165; A47L 9/1641; A47L 9/1625; A47L 9/108;
(Continued)

(56) References Cited

U.S. PATENT DOCUMENTS 8,978,197 B2 * 3/2015 Kang ............... A47L 9/108
15/347
9,609,990 B2 * 4/2017 Dimbylow ............ A47L 5/362
(Continued)

FOREIGN PATENT DOCUMENTS

| EP | 1857032 | 11/2007 |
|---|---|---|
| JP | 2014-033879 | 2/2014 |

(Continued)

OTHER PUBLICATIONS

International Search Report (Full English Text) and Written Opinion dated May 18, 2016 issued in Application No. PCT/KR2016/000515.
(Continued)

*Primary Examiner* — Dung H Bui
(74) *Attorney, Agent, or Firm* — Ked & Associates, LLP

(57) ABSTRACT

A dust collector for a vacuum cleaner disclosed herein includes an outer case forming a lateral appearance of the dust collector, and provided with a first cyclone unit capable of filtering out dust from externally-introduced air and allowing an introduction of the dust-filtered air therein, and an upper case coupled to an upper portion of the outer case to cover the first cyclone unit, the outer case including a second cyclone unit capable of separating fine dust from the air introduced into the first cyclone unit, and a fine dust collecting unit capable of collecting the fine dust separated through the second cyclone unit, wherein the second cyclone unit includes a left cyclone portion and a right cyclone portion disposed at both left and right sides of the fine dust (Continued)

collecting unit and each having outlets, each of the outlets communicating with an inside of the fine dust collecting unit.

14 Claims, 8 Drawing Sheets

(51) Int. Cl.
   *B01D 39/12* (2006.01)
   *B01D 45/16* (2006.01)
   *B04C 3/04* (2006.01)
(52) U.S. Cl.
   CPC ............ *A47L 9/1616* (2013.01); *A47L 9/1625* (2013.01); *A47L 9/1641* (2013.01); *A47L 9/1683* (2013.01); *B01D 39/12* (2013.01); *B01D 45/16* (2013.01); *B01D 50/002* (2013.01); *B04C 3/04* (2013.01)
(58) Field of Classification Search
   CPC ....... A47L 9/1683; A47L 9/1616; B04C 3/04; B01D 45/16; B01D 50/002; B01D 39/12
   See application file for complete search history.

(56) References Cited

U.S. PATENT DOCUMENTS

| | | | |
|---|---|---|---|
| 10,130,226 B2* | 11/2018 | Shin | A47L 9/108 |
| 2005/0252179 A1* | 11/2005 | Oh | A47L 9/1625 55/337 |
| 2007/0143953 A1 | 6/2007 | Hwang et al. | |
| 2014/0366495 A1 | 12/2014 | Stickney et al. | |
| 2015/0000077 A1 | 1/2015 | Conrad | |

FOREIGN PATENT DOCUMENTS

| | | |
|---|---|---|
| JP | 2014-079661 | 5/2014 |
| WO | WO 2014/023970 | 2/2014 |

OTHER PUBLICATIONS

European Search Report dated Apr. 20, 2018 issued in Application No. 16740366.6.

* cited by examiner

[Fig. 1]
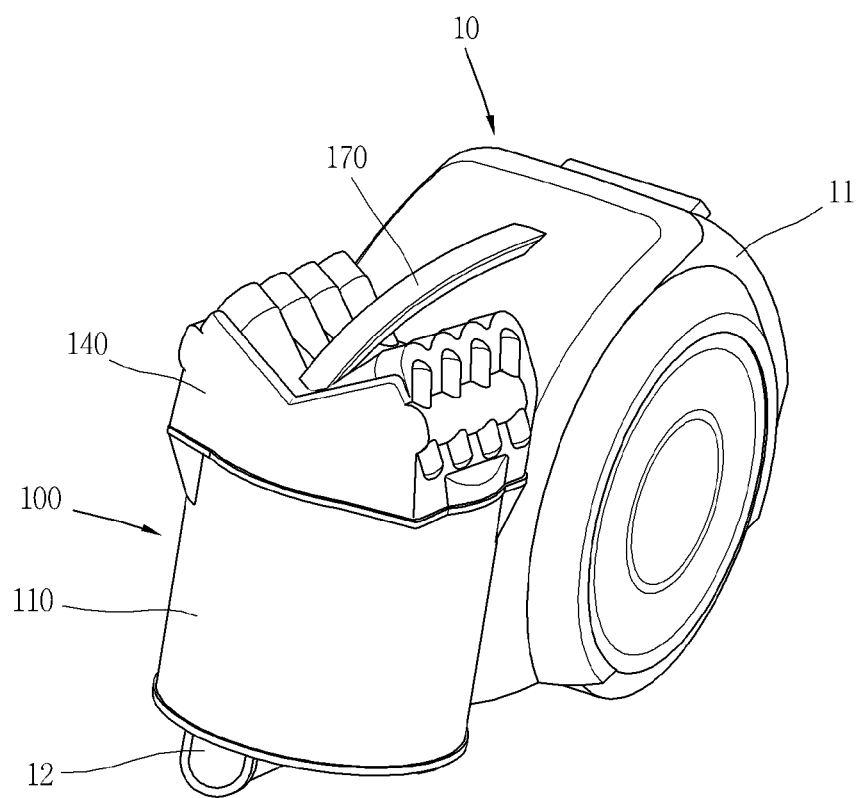

[Fig. 2]
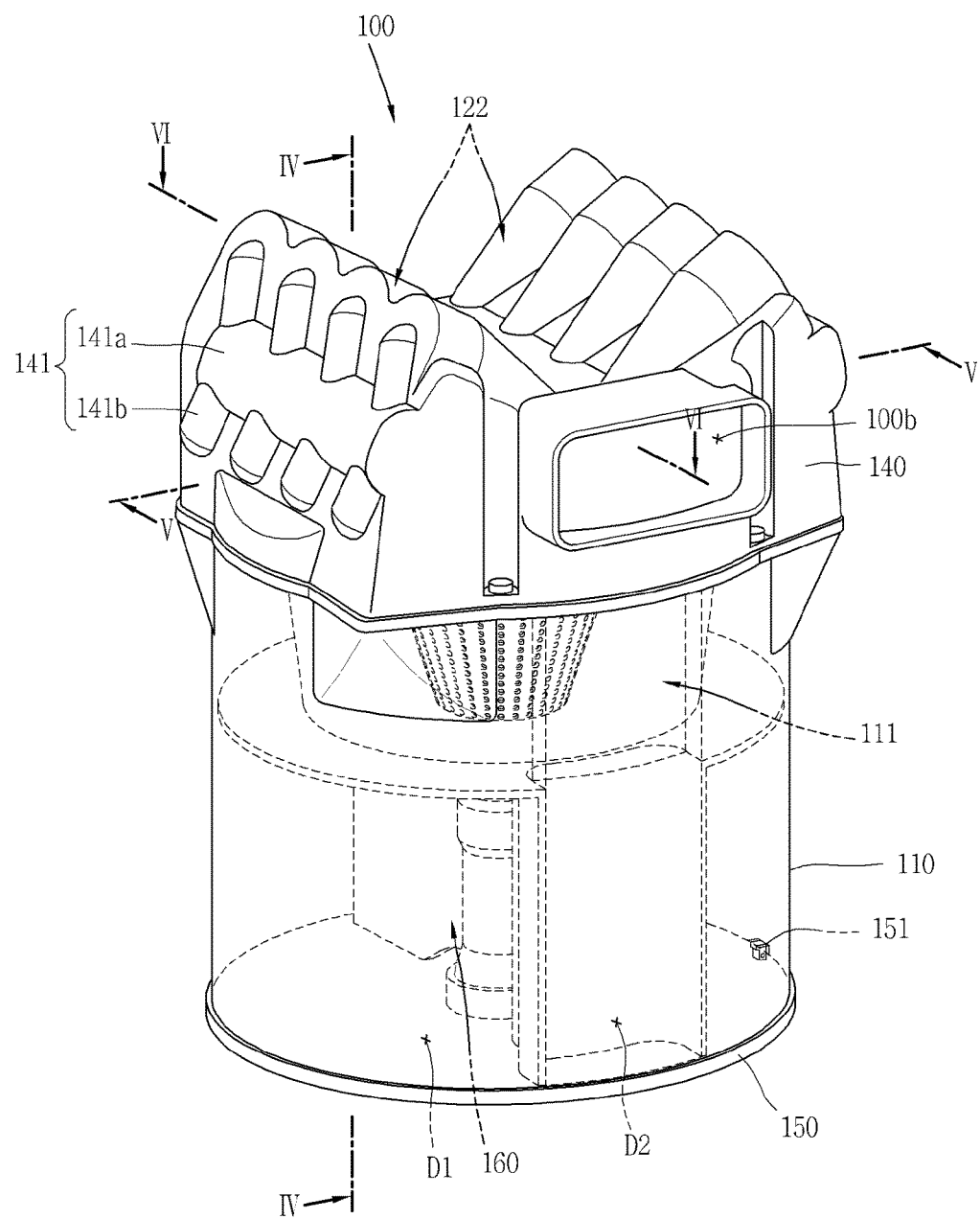

[Fig. 3]
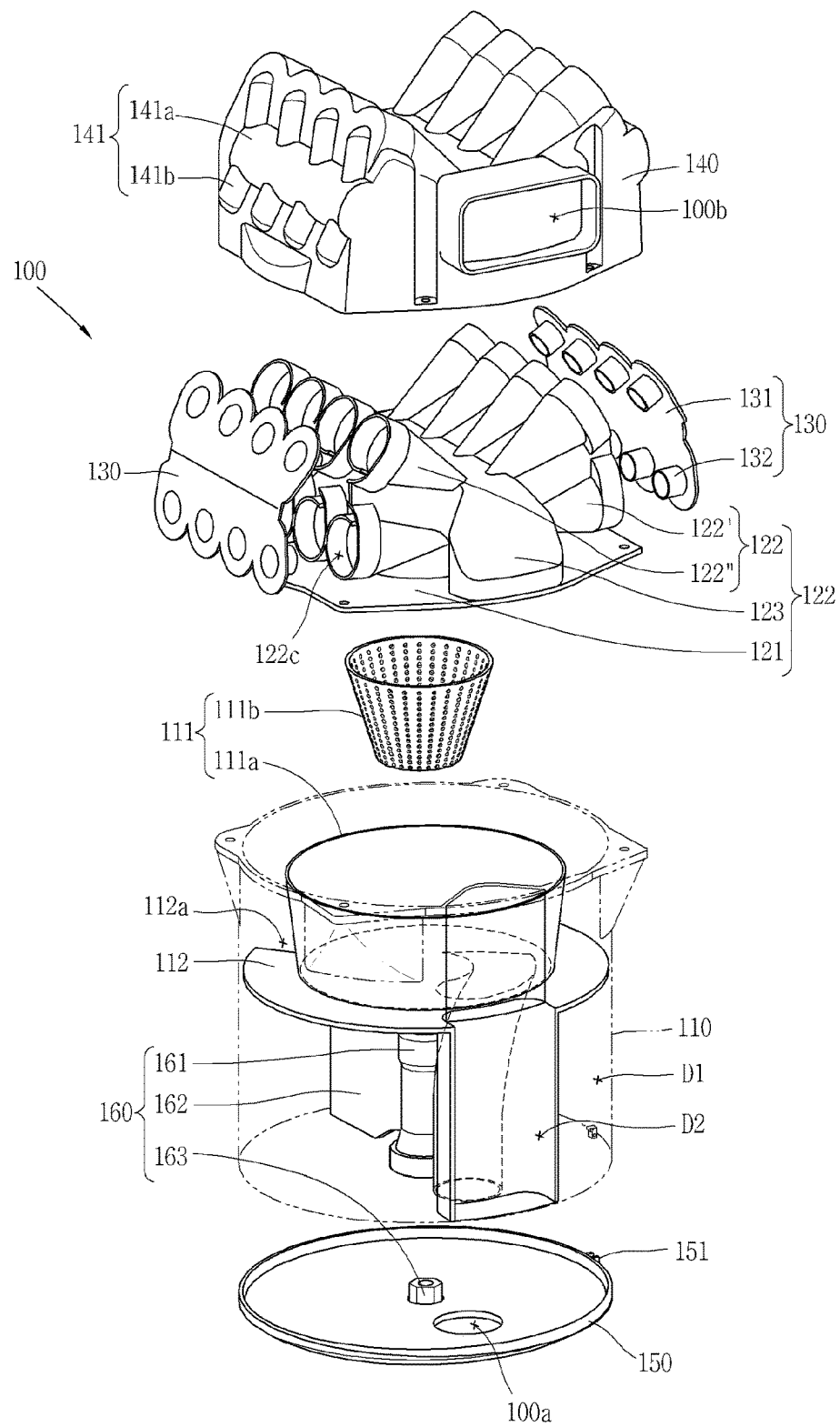

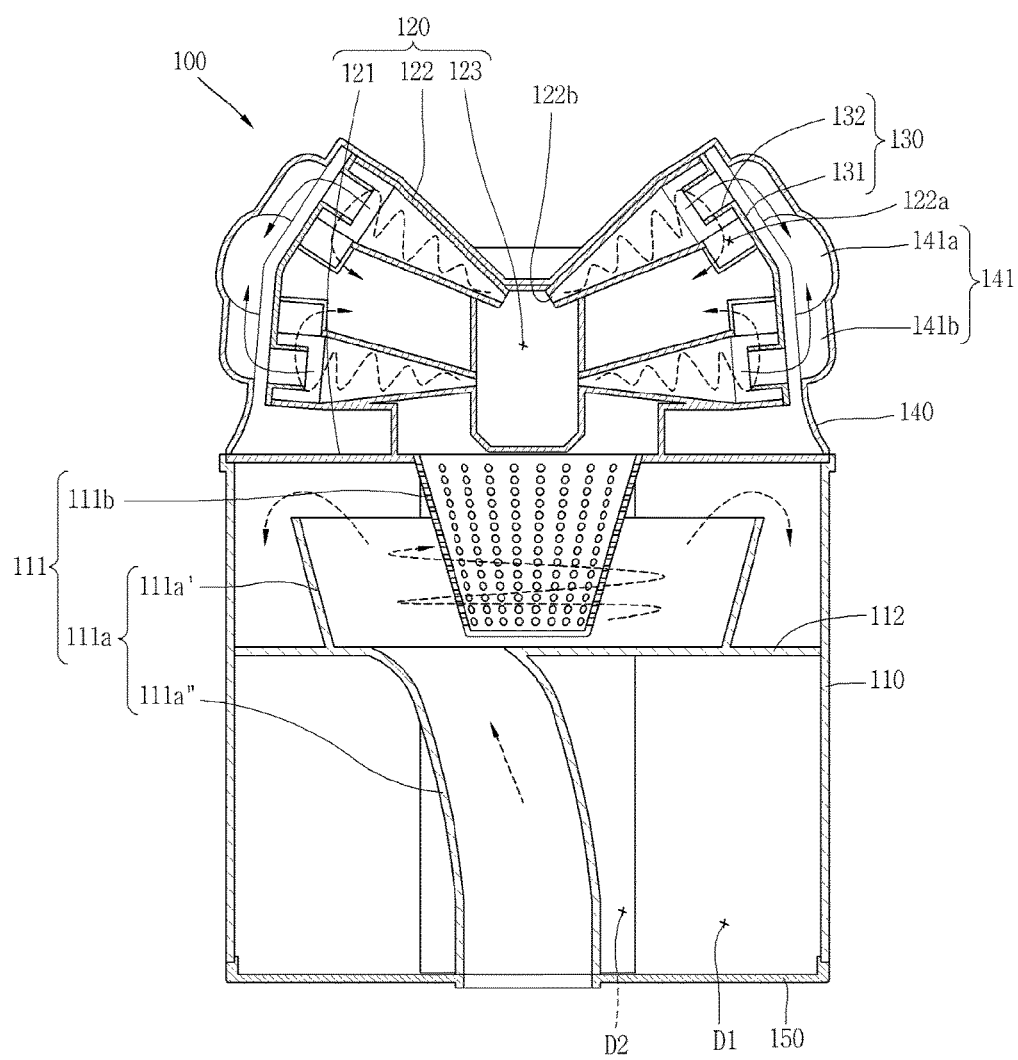
[Fig. 4]

[Fig. 5]
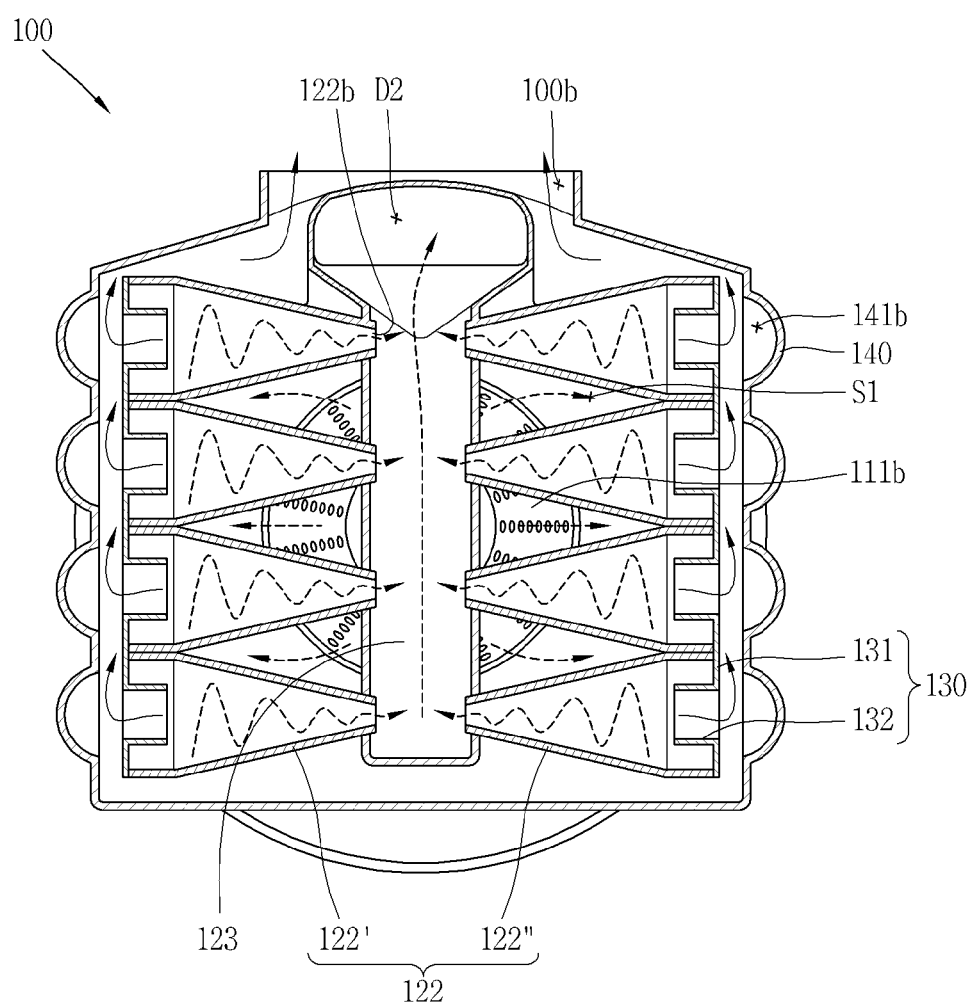

[Fig. 6]
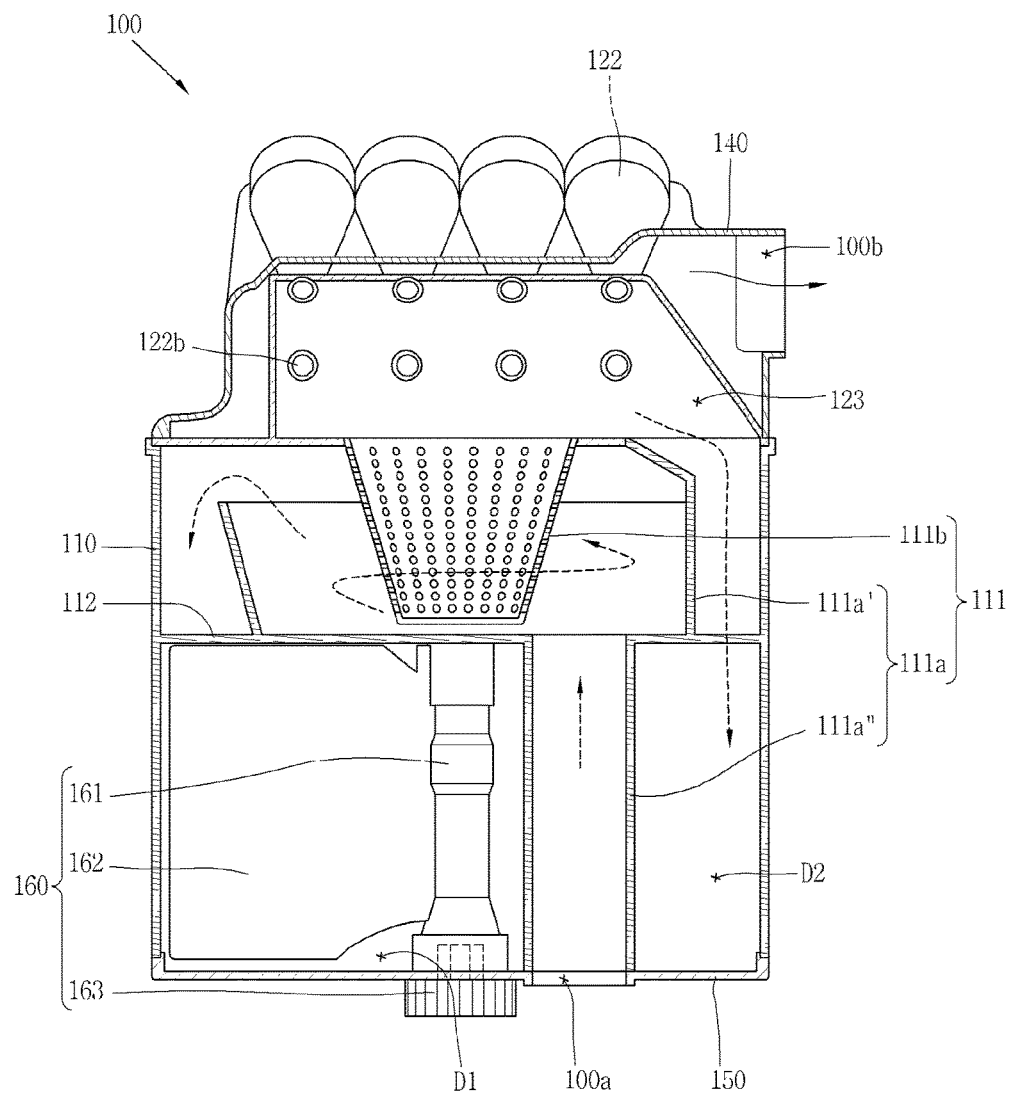

[Fig. 7]
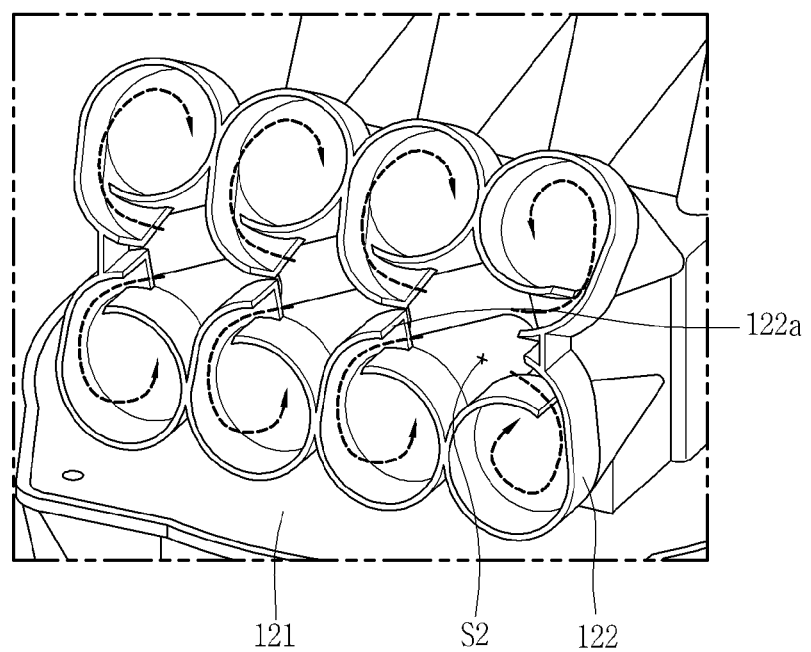

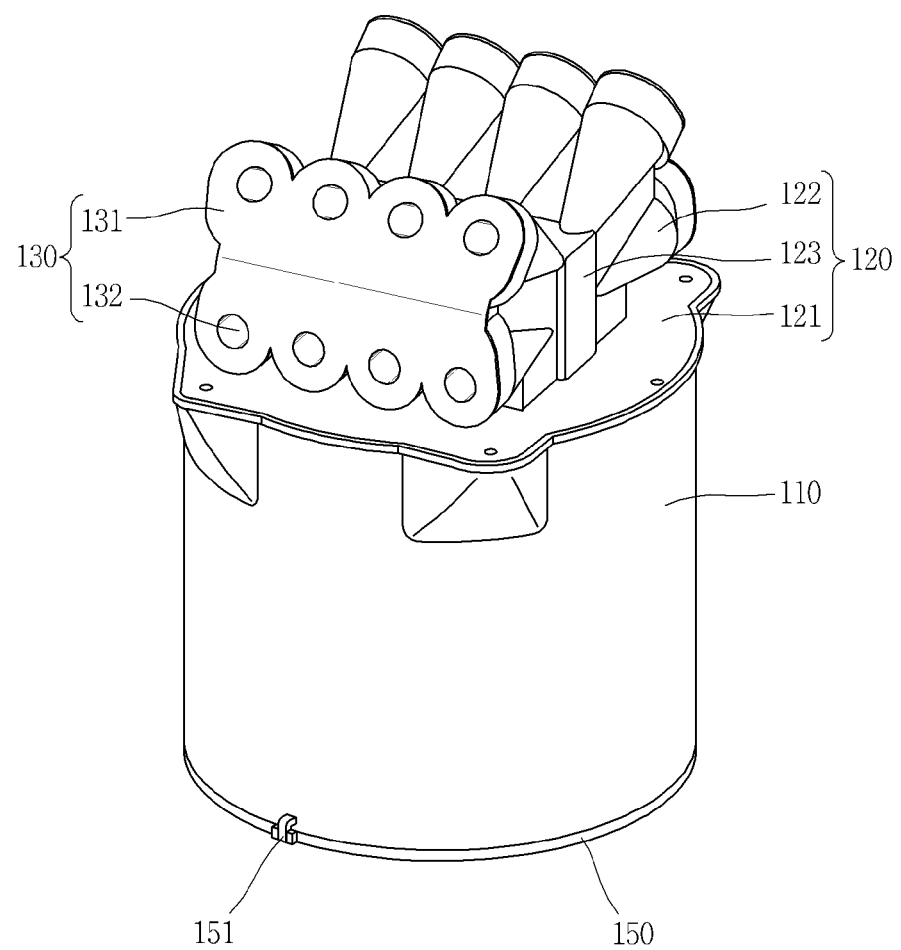
[Fig. 8]

DUST COLLECTOR FOR VACUUM CLEANER

CROSS-REFERENCE TO RELATED PATENT APPLICATIONS

This application is a U.S. National Stage Application under 35 U.S.C. § 371 of PCT Application No. PCT/KR2016/000515, filed Jan. 19, 2016, which claims priority to Korean Patent Application No. 10-2015-0008868, filed Jan. 19, 2015, whose entire disclosures are hereby incorporated by reference.

TECHNICAL FIELD

This specification relates to a dust collector for a vacuum cleaner, capable of collecting dust and fine dust by separating the dust and fine dust from air introduced into the vacuum cleaner through a multi-cyclone, and discharging the collected dust and fine dust.

BACKGROUND ART

A vacuum cleaner is an electrical apparatus of introducing air using suction power generated by a suction motor and separating dust or dirt from the air to discharge clean air.

Types of vacuum cleaners may be classified into i) a canister type, ii) an upright type, iii) a hand type, iv) a cylindrical floor type and the like.

The canister type vacuum cleaner is a vacuum cleaner mostly used at home, which is a vacuum cleaner with a method of communicating a suction nozzle with a body through a connecting member. The canister type vacuum cleaner is appropriate for cleaning hard floors because of merely using sucking force for the cleaning.

On the contrary, the upright type is a vacuum cleaner in which a suction nozzle and a cleaner body are integrally formed with each other. The upright type vacuum cleaner can clean even dust within a carpet, unlike the canister type vacuum cleaner, by virtue of employing a rotating brush.

However, the related art vacuum cleaners have several drawbacks as follows.

In general, for a dust collector having a multi-cyclone type, a second cyclone unit is laminated on a first cyclone unit, which may cause a problem of increasing a height of the dust collector. To overcome such height increase issue, the dust collector of the multi-cyclone type is configured such that the second cyclone unit is disposed inside or outside the first cyclone unit.

For the former, the lamination for the effective arrangement of the second cyclone unit has been proposed. However, as steps increase, the overall height of the dust collector increases. A higher step also suffers from a reduced introduction of air flow. In addition, when a handle is attached to an upper portion of the dust collector for user convenience, the overall height of the dust collector further increases.

For the latter, it is difficult to efficiently arrange the second cyclone unit inside or outside the first cyclone unit due to interference between guide passages of the second cyclone unit. Even when the second cyclone unit is disposed inside or outside the first cyclone unit, a number of the second cyclone unit is significantly decreased and thereby sucking force is reduced, which results in deterioration of a cleaning performance. Also, due to a reduced space for storing dust and fine dust, a user has to frequently throw away the stored dust and fine dust.

Furthermore, the related art cleaner has a limit in providing user convenience during a dust discharging process. There are vacuum cleaners in which dust are blown away during the process of discharging dust, and other vacuum cleaners requiring for a very complicated process to discharge dust.

DISCLOSURE OF INVENTION

Technical Problem

Therefore, an aspect of the detailed description is to provide a dust collector for a vacuum cleaner with a novel structure, capable of laminating a second cyclone unit on a first cyclone unit by improving a multi-cyclone structure, and also improving a cleaning performance by efficiently arranging more second cyclones.

Another aspect of the detailed description is to provide a dust collector, capable of collecting dust and fine dust in a separating manner and discharging the collected dust and fine dust in a simultaneous manner.

Another aspect of the detailed description is to provide a dust collector, capable of compressing dust to facilitate a discharge of the dust.

Solution to Problem

To achieve these and other advantages and in accordance with the purpose of this specification, as embodied and broadly described herein, there is provided a dust collector for a vacuum cleaner, the dust collector including an outer case forming a lateral appearance of the dust collector, and provided with a first cyclone unit capable of filtering out dust from air introduced from outside and allowing an introduction of the dust-filtered air therein, and an upper case coupled to an upper portion of the outer case to cover the first cyclone unit, and provided with a second cyclone unit capable of separating fine dust from the air introduced into the first cyclone unit, and a fine dust collecting unit capable of collecting the fine dust separated through the second cyclone unit. The second cyclone unit may include a left cyclone portion and a right cyclone portion disposed at both left and right sides of the fine dust collecting unit and each having outlets, each which communicates with an inside of the fine dust collecting unit.

Each of the left cyclone portion and the right cyclone portion may include a plurality of cyclones arranged in horizontal and vertical directions.

An empty space between the plurality of cyclones may form an introduction passage communicating with inlets of the plurality of cyclones, respectively, such that the air introduced into the first cyclone unit is introduced into each of the inlets.

One of the plurality of cyclones may be disposed on another cyclone, and an inlet of each of the plurality of cyclones may extend to a space formed between the one cyclone and the another cyclone.

The dust collector for the vacuum cleaner may further include a cover member disposed to cover openings of the plurality of cyclones, respectively, and provided with vortex finders communicating with openings such that the fine dust-separated air is discharged, and an upper cover disposed to cover the upper case and provided with a discharge guide communicating the vortex finders with an exit of the dust collector.

In accordance with another exemplary embodiment disclosed herein, the fine dust collecting unit may communicate with a fine dust storage unit provided in the outer case.

The first cyclone unit may include an inner housing communicating with an entrance of the dust collector through which air is introduced, and a mesh filter disposed in the inner housing and capable of separating dust from the air introduced into the inner housing.

The inner housing may include a first part surrounding the mesh filter and spaced apart from the upper case such that dust is dischargeable, and a second part connecting the entrance of the dust collector to the first part, and extending toward an inner circumference of the first portion so as to generate a rotational flow of air introduced into the first part.

A partition plate may be provided in an annular space between the outer case and the first portion. The partition plate may be disposed to cover at least part of the annular space and have an opening at one portion thereof such that dust filtered out through the first cyclone unit is introduced into a preset area of a dust storage unit disposed below the partition plate.

The dust filtered out through the first cyclone unit may be collected in a dust storage unit, which is provided within the outer case in a manner of being independent of the fine dust storage unit. A lower cover may be provided at a lower portion of the outer case. The lower cover may form a bottom surface of the dust storage unit and the fine dust storage unit when closed, and be capable of simultaneously opening the dust storage unit and the fine dust storage unit when opened such that the dust and the fine dust are simultaneously discharged.

Also, the present invention may provide a dust collector for a vacuum cleaner. The dust collector may include a first cyclone unit provided in an outer case and capable of filtering out dust from externally-introduced air and allowing an introduction of the dust-filtered air therein, a second cyclone unit disposed above the first cyclone unit and capable of separating fine dust from the air introduced into the first cyclone unit, and a fine dust collecting unit capable of collecting fine dust separated through the second cyclone unit. The second cyclone unit may include a left cyclone portion and a right cyclone portion disposed at both left and right sides of the fine dust collecting unit and each having outlets, each of the outlets communicating with an inside of the fine dust collecting unit.

Advantageous Effects of Invention

In accordance with the present invention having such configuration, a second cyclone unit may be divided into a left cyclone portion and a right cyclone portion based on a fine dust collecting unit disposed above a first cyclone unit. This may allow for an efficient arrangement of more second cyclones, resulting in improvement of a cleaning performance of the vacuum cleaner.

Also, a handle may be provided between the left cyclone portion and the right cyclone portion which are arranged in a V-like shape, thereby facilitating an efficient use of a space.

A dust storage unit and a fine dust storage unit may simultaneously be open upon detaching a lower cover, which may allow for simultaneous discharge of dust collected in the dust storage unit and fine dust collected in the fine dust storage unit.

Also, dust collected can be gathered by a pressing unit, which may result in preventing the collected dust from being scattered.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a perspective view illustrating one example of a vacuum cleaner in accordance with the present invention;

FIG. 2 is a conceptual view of the dust collector illustrated in FIG. 1;

FIG. 3 is an exploded conceptual view illustrating main components in the dust collector illustrated in FIG. 2 in a separate manner;

FIG. 4 is a longitudinal sectional view of the dust collector of FIG. 2, taken along the line IV-IV;

FIG. 5 is a horizontal sectional view of the dust collector of FIG. 2, taken along the line V-V;

FIG. 6 is a longitudinal sectional view of the dust collector of FIG. 2, taken along the line VI-VI;

FIG. 7 is a conceptual view of a second cyclone unit illustrated in FIG. 3; and FIG. 8 is a conceptual view illustrating a state that a cover member is coupled to the second cyclone unit illustrated in FIG. 3.

MODE FOR THE INVENTION

Description will now be given in more detail of a dust collector for a vacuum cleaner according to the present invention, with reference to the accompanying drawings.

For the sake of brief description with reference to the drawings, the same or equivalent components may be provided with the same or similar reference numbers, and description thereof will not be repeated.

In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

FIG. 1 is a perspective view illustrating one example of a vacuum cleaner 10 in accordance with the present invention.

As illustrated in FIG. 1, the vacuum cleaner 10 may include a cleaner body 11 having a fan unit (not illustrated) generating sucking force (suction power). The fan unit may include a suction motor, and a suction fan that is rotated by the suction motor to generate the sucking force.

Although not illustrated, the vacuum cleaner 10 may further include a suction nozzle (not illustrated) through which air containing foreign materials is introduced, and a connection member (not illustrated) by which the suction nozzle is connected to the cleaner body 11. The basic configuration of the suction nozzle and the connection member is the same as that of the related art, so description thereof will be omitted.

A suction unit 12 for sucking air introduced through the suction nozzle and foreign materials (substances) contained in the air may be provided at a lower end portion of a front surface of the cleaner body 11. The air and the foreign materials may be introduced into the suction unit 12 in response to an operation of the fan unit. The air and the foreign materials introduced in the suction unit 12 may then flow into a dust collector 100 and then be separated from each other in the dust collector 100.

The dust collector 100 may be configured to collect foreign materials or dust by separating the foreign materials or dust from the sucked air, and discharge air without the dust. The dust collector 100 may be detachably configured on the cleaner body 11.

Hereinafter, description will be given of a configuration of the dust collector 100 and the flow of air and foreign materials within the dust collector 100.

FIG. 2 is an exploded conceptual view of the dust collector 100 illustrated in FIG. 1, and FIG. 3 is a conceptual view illustrating main components in the dust collector 100 illustrated in FIG. 2 in a separate manner.

FIG. 4 is a longitudinal sectional view of the dust collector 100 of FIG. 2, taken along the line IV-IV, FIG. 5 is a horizontal sectional view of the dust collector 100 of FIG. 2, taken along the line V-V, FIG. 6 is a longitudinal sectional view of the dust collector 100 of FIG. 2, taken along the line VI-VI, FIG. 7 is a conceptual view of a second cyclone unit 122 illustrated in FIG. 3, and FIG. 8 is a conceptual view illustrating a state that a cover member 130 is coupled to the second cyclone unit 122 illustrated in FIG. 3.

For reference, those drawings illustrate the duct collector 100 applied to a canister type vacuum cleaner, but the dust collector 100 according to the present invention may not be necessarily limited to the upright type vacuum cleaner 10. The dust collector 100 according to the present invention may be also applicable to an upright type vacuum cleaner.

Referring to those drawings, air and foreign materials may be introduced into an entrance 100a of the dust collector 100 through the suction unit 12 by sucking force that is generated in the fan unit of the vacuum cleaner 10. The air which is introduced into the dust collector 100 through the entrance 100a may be filtered sequentially at a first cyclone unit 111 and a second cyclone unit 122 while flowing along a passage to be explained later, and then discharged through an exit 100b. Dust and fine dust separated from the air may be collected in a dust storage unit D1 and a fine dust storage unit D2 of the dust collector 100.

A cyclone refers to an apparatus for providing rotational flow to fluid in which particles are floating to separate the particles from the fluid by a centrifugal force. The cyclone may separate foreign materials such as dust, fine dust and the like from air introduced into the cleaner body 11 by sucking force. For the sake of brief description in the present invention, relatively large dust is referred to as "dust," relatively small dust is referred to as "fine dust," and dust smaller than "fine dust" is referred to as "ultra-fine dust."

The dust collector 100 according to one exemplary embodiment disclosed herein may include an outer case 110, an upper case 120, a cover member 130, an upper cover 140 and a lower cover 150.

The outer case 110 may define a lateral appearance of the dust collector 100. The outer case 110 may preferably be formed in a cylindrical shape, as illustrated in the drawing, but may not be limited to the shape. For example, the outer case 110 may be formed in a polygonal columnar shape.

A first cyclone unit 111 may be disposed in the outer case 110. The first cyclone unit 111 may be configured to filter out dust from air introduced along with foreign materials, and allow the dust-filtered air to be introduced into the dust collector 100.

The first cyclone unit 111 may include an inner housing 111a and a mesh filter 111b.

The inner housing 111a may be disposed in the outer case 110. The inner housing 111a may communicate with the entrance 100a disposed at the lower portion of the dust collector 100 such that air can be introduced into the dust collector 100. The inner housing 111a may be connected to the outer case 110 by a partition plate 112, which will be explained later, so as to configure an integral form with the outer case 110. Air which is introduced into the inner housing 111a through the entrance 100a may turn (rotate) along an inner circumference of the inner housing 111a.

Hereinafter, a detailed structure of the inner housing 111a will be described. The inner housing 111a may include a first part 111a' and a second part 111a" disposed at upper and lower portions thereof, respectively.

The first part 111a' may surround the mesh filter 111b, and form a space in which air can rotate (turn, spin) along the inner circumference of the inner housing 111a. The first part 111a' may be spaced apart from the upper case 120 such that dust can be discharged.

The second part 111a" may be disposed to connect the entrance 100a of the dust collector 100 and the first part 111a' to each other. As illustrated, the second part 111a" may extend in a curved shape toward an inner circumference of the first part 111a', so as to induce a rotational flow of air introduced into the first part 111a'.

The mesh filter 111b may be installed in the first part 111a' to separate dust from air introduced into the first part 111a'. The mesh filter 111b may have a mesh or porous shape to allow dust and fine dust to pass therethrough. Criteria of sizes to distinguish dust and fine dust from each other may be decided by the mesh filter 111b. Foreign materials which are small enough to pass through the mesh filter 111b may be classified into fine dust, and foreign materials which is large enough to fail to pass through the mesh filter 111b may be classified into dust.

The mesh filter 111b may have a shape of a truncated cone whose sectional area is gradually reduced from top to bottom. The shape may facilitate dust stuck on the mesh filter 111b to be separated by the gravity.

Hereinafter, a process in which dust is separated by the first cyclone unit 111 will be described in detail. Air and foreign materials may be introduced into the inner housing 111a through the entrance 100a of the dust collector 100, and then rotate (spin) along the inner circumference of the inner housing 111a.

During this process, dust which is relatively heavier than air may gradually flow upward while spirally rotating along the inner circumference of the inner housing 111a. Afterwards, the dust may be discharged out of the first part 111a' by a centrifugal force through an open space between the first part 111a' and the upper case 120, and then collected in the dust storage unit D1 to be explained later. To facilitate the dust rotating along the inner circumference of the first part 111a' to be discharged to the outside, the first part 111a' may extend in an outwardly inclined manner toward its upper side.

Meanwhile, unlike the dust, air may be introduced into the mesh filter 111b by sucking force through the mesh filter 111b. In this instance, fine dust which is smaller than the dust may also be introduced into the mesh filter 111b along with the air.

Referring to FIG. 4, an internal structure of the dust collector 100 and the flow of air and foreign materials in the dust collector 100 can be checked.

The upper case 120 may be mounted to a top of the outer case 110 to cover the first cyclone unit 111. The upper case 120 may include a cover unit 121, a second cyclone unit 122, and a fine dust collecting unit 123, which may be integrally formed of synthetic resin through injection molding or 3D-printing.

The cover unit 121 may be formed in a shape of a flat plate and cover the upper portion of the outer case 110. A mesh filter mounting portion (not illustrated) for fixing the mesh filter 111b of the first cyclone unit 111 may be provided at a lower surface of the cover unit 121.

The second cyclone unit 122 may be configured to separate fine dust from air introduced into the first cyclone unit 111. The second cyclone unit 122 may include a left cyclone portion 122' and a right cyclone portion 122" disposed at both left and right sides of the fine dust collecting unit 123, respectively.

The fine dust collecting unit 123 may be disposed between the left cyclone portion 122' and the right cyclone portion 122", to collect fine dust separated through the second cyclone unit 122. Outlets 122b of the left cyclone portion 122' and the right cyclone portion 122" may communicate with an inside of the fine dust collecting unit 123, such that fine dust separated by the second cyclone unit 122 can be collected into the fine dust collecting unit 123.

Each of the left cyclone portion 122' and the right cyclone portion 122" may include a plurality of cyclones which are arranged in at least one direction. This exemplary embodiment illustrates that each of the left cyclone portion 122' and the right cyclone portion 122" includes a plurality of cyclones arranged in horizontal and vertical directions on the cover unit 121.

Each cyclone has a conic shape. Accordingly, when the plurality of cyclones are arranged in a manner of being layered up and down, an inclined angle of an upper cyclone with respect to the cover unit 121 may be greater than an inclined angle of a lower cyclone with respect to the cover unit 121. Therefore, when viewing the dust collector 110 from a front side, the second cyclone unit 122 may be formed in a shape similar to an alphabet 'V.'

Meanwhile, each of the plurality of cyclones configuring the second cyclone unit 122 may be provided with an inlet 122a which extends in a curved shape toward the inner circumference. The shape of the inlet 122a may allow air introduced through the inlet 122a to rotate along the inner circumference of the cyclone.

Air passed through the mesh filter 111b may then be introduced into the left cyclone portion 122' and the right cyclone portion 122", respectively. In this instance, an empty space S1 between the plurality of cyclones may generate an introduction passage communicating the inlets 122a, such that the air can be introduced into each inlet 122a of the plurality of cyclones. That is, the empty space S1 may connect the respective inlets 122a of the plurality of cyclones to the inside of the mesh filter 111b.

As aforementioned, the plurality of cyclones may have the arrangement that they are layered up and down, and each inlet 122a of the plurality of cyclones may extend into a space S2 between the upper cyclones and the lower cyclones which are spaced apart from each other. The air introduced into the empty space S1 may be introduced into the space S2 and then flow into each of the inlets 122a. Those inlets 122a may be arranged to face each other.

Such structure may result in reducing a flow loss of air passed through the mesh filter 111b, and more efficiently arranging the plurality of cyclones configuring the second cyclone unit 122.

Meanwhile, cover members 130 may be mounted to the left cyclone portion 122' and the right cyclone portion 122", respectively, to cover openings 122c of the plurality of cyclones configuring the second cyclone unit 122. Each cover member 130 may be provided with a vortex finder 132 communicating with the corresponding opening 122c, such that air from which the fine dust has been separated can be discharged therethrough.

As illustrated, the cover member 130 may include a base portion 131 in a shape of a plate, and a plurality of vortex finders 132 corresponding to the plurality of openings 122c, respectively. The base portion 131 may have a shape that a middle portion thereof between the upper and lower cyclones is bent, so as to correspond to the upper and lower cyclones arranged at different inclined angles on the cover unit 121.

The upper cover 140 may cover the upper case 120 to which the cover member 130 is coupled, and thereby define an upper appearance. The upper cover 140 may have an outer shape corresponding to the upper case 120. For example, the upper cover 140 may be formed in a V-like shape to correspond to an outer shape of the second cyclone unit 122.

The upper cover 140 may be coupled to the outer case 110 or the cover member 130. The upper cover 140 may be provided with a discharge guide 141 through which the vortex finders 132 and the exit 100b of the dust collector 100 communicate with each other.

This exemplary embodiment illustrates that the discharge guide 141 includes a first discharge guide 141a extending along a middle portion between the upper and lower cyclones and communicating with the exit 100b, and a plurality of second discharge guides 141b connecting the vortex finders 132 and the first discharge guide 141a to each other. With the structure, air discharged into the vortex finders may be collected in the first discharge guide 141a through the second discharge guides 141b, and then finally discharged to the exit 100b.

Meanwhile, the vacuum cleaner 10 may be provided with a handle 170 that facilitates the user to lift the vacuum cleaner 10. Both end portions of the handle 170 may be coupled to the upper cover 140 and the cleaner body 11, and at least one of the both end portions may be detachable.

For effective use of a space, the handle 170 may be located between the left cyclone portion 122' and the right cyclone portion 122". FIG. 1 exemplarily illustrates that the handle 170 is disposed in a relatively recessed space between the left cyclone portion 122' and the right cyclone portion 122" in a manner of extending along an extending direction of a fine dust collecting unit 123.

In the meantime, dust which is filtered out through the first and second cyclone units 111 and 112 may be collected in the dust storage unit D1 and the fine dust storage unit D2, respectively. The dust storage unit D1 and the fine dust storage unit D2 may be independent spaces of each other within the outer case 110.

A partition wall 112 which forms an upper wall of the dust storage unit D1 may be provided in an annular space between the outer case 110 and the first part 111a', in a manner of covering at least part of the annular space. The partition plate 112 may be provided with an opening 112a, through which the dust filled out by the first cyclone unit 111 can be introduced into a preset area of the dust storage unit D1. As aforementioned, the inner housing 111a of the first cyclone unit 111 and the partition plate 112 may be integrally formed with the outer case 110.

The fine dust storage unit D2 may be provided in the outer case 110, in a manner of communicating with the fine dust collecting unit 123 of the upper case 120. The fine dust storage unit D2 may extend in an up and down direction of the outer case 110. The drawing illustrates that the fine dust storage unit D2 is formed in the outer case 110 in a shape of a through hole.

As illustrated in FIG. 1, the dust collector 100 may be disposed inclined with respect to a ground when being mounted to the cleaner body 11. Accordingly, the fine dust collecting unit 123 may be inclined down toward the fine dust storage unit D2, such that the fine dust collected in the fine dust collecting unit 123 may be introduced and stored into the fine dust storage unit D2.

Referring to FIG. 3, the dust storage unit D1 and the fine dust storage unit D2 may be open toward a lower portion of the outer case 110. The lower cover 140 may be coupled to the outer case 110 to cover the openings of the dust storage unit D1 and the fine dust storage unit D2, so as to form a bottom surface of the dust storage unit D1 and the fine dust storage unit D2.

In this manner, the lower cover 150 may be coupled to the outer case 110 to open and close the lower portion of the outer case 110. This exemplary embodiment illustrates that the lower cover 150 is coupled to the outer case 110 by a hinge and is rotated to open and close the lower portion of the outer case 110. However, the present invention may not be limited to this, and the lower cover 140 may also be fully detachably coupled to the outer case 110.

The lower cover 150 may be coupled to the outer case 110 to form the bottom surface of the dust storage unit D1 and the fine dust storage unit D2. The lower cover 150 may be rotated centering on a hinge 151 to simultaneously open the dust storage unit D1 and the fine dust storage unit D2 such that the dust and fine dust can be simultaneously discharged.

The dust and fine dust may be simultaneously discharged when the dust storage unit D1 and the fine dust storage unit D2 are simultaneously open in response to the lower cover 140 being rotated centering on the hinge 151.

On the other hand, when the dust collected in the dust storage unit D1 is in a dispersed state without being gathered at one area, the dust may be liked to be blown away or discharged to an unexpected place during discharging of the dust. To overcome this problem, the present invention may reduce a volume of the dust collected in the dust storage unit D1 by pressing the dust using a pressing unit 160.

The pressing unit 160 may be bidirectionally rotatable in the dust storage unit D1. The pressing unit 160 may include a rotation shaft 161 and a pressing member 162.

The rotation shaft 161 may be rotatably disposed beneath the first part 111a' of the inner housing 111a. The rotation shaft 161 may be rotatable by receiving a driving force transferred from a driving motor of the cleaner body 11. The rotation shaft 161 may be rotatable in a clockwise or counterclockwise direction, namely, in a bidirectional manner.

The pressing member 162 may be connected to the rotation shaft 161 so as to be rotatable in the dust storage unit D1 in response to the rotation of the rotation shaft 161. The pressing member 162 may be formed in a shape of a plate. The dust collected in the dust storage unit D1 may be gathered by being moved (pushed) to one side of the dust storage unit D1, in response to the rotation of the pressing member 162. Accordingly, when a large amount of dust is collected, the large amount of dust may be compressed by the pressing member 162.

An inner structure for collecting dust which is moved to the one side by the rotation of the pressing member 162 may be provided in the dust storage unit D1. This exemplary embodiment illustrates that a second part 111a" of the inner housing 111a is disposed at the rear of the rotation shaft 161 to perform the inner structure.

On the other hand, separate inner walls (not illustrated) may be provided at both sides of the second part 111a". In this instance, dust introduced into the dust storage unit D1 may be collected at one side of each of the inner walls by the rotation of the pressing member 162. The inner walls may protrude from an inner circumference of the outer case 110, or integrally formed with the partition plate 112 located on an upper portion of the inner walls.

A lower end portion of the pressing unit 160 may penetrate through the lower cover 150 to be exposed to outside of the dust collector 100. As illustrated, a driven gear 163 that is engaged with the rotation shaft 161 when the lower cover 150 is coupled to the outer case 110 may be installed at the lower cover 150. The driven gear 163 may be relatively rotatable with respect to the lower cover 150. When the dust collector 100 is coupled to the cleaner body 11 (see FIG. 1), the driven gear 163 may be engaged with a driving gear (not illustrated) of the cleaner body 11 so as to transfer a driving force of the driving gear to the rotation shaft 161.

The structure of transferring a driving force of a driving unit of the cleaner body 11 to the rotation shaft 161 can vary according to a design change. For example, the rotation shaft 161 may penetrate through the lower cover 150 so as to be directly engaged with the driving gear of the driving unit.

Any structure may be allowed if the lower end portion of the pressing unit 160 is relatively rotatable with respect to the lower cover 150. A relatively rotated portion of the lower cover 150 may be provided with a sealing member for sealing therebetween.

When the dust collector 100 is coupled to the cleaner body 11, the pressing unit 160 may be configured to be connected to the driving gear of the cleaner body 11. The driving gear may receive the driving force from the driving unit of the cleaner body 11. The driving unit of the cleaner body 11 may include a driving motor (not illustrated). The driving motor may be different from the aforementioned suction motor.

The driving force transferred to the driving gear of the cleaner body 11 may then be transferred to the pressing unit 160. The driven gear 163 may be rotated by the driving force transferred through the driving gear, and accordingly the rotation shaft 161 and the pressing unit 161 may also be rotated along with the driven gear 163.

In this instance, the driving motor may control the pressing member 162 to repetitively perform the bidirectional rotation of the pressing member 162. For example, when a repulsive force is applied in a direction opposite to a rotating direction, the driving motor may control the pressing member 162 to be rotated in the opposite direction. That is, when dust, which has been collected at one side in response to the pressing member 162 being rotated in one direction, is compressed by a predetermined level, the driving motor may control the pressing member 162 to be rotated in another direction such that the pressing member 162 can compress dust collected at another side.

When dust is rarely collected, the pressing member 162 may be affected by a repulsive force due to being collided with an inner structure, or by a stopper provided on a rotation path of the pressing member 162. Accordingly, the pressing member 162 may be rotated in an opposite direction.

On the other hand, a controller of the cleaner body 11 may apply a control signal to the driving motor to change the rotating direction of the pressing member 162 at a predetermined time interval, such that the bidirectional rotation of the pressing member 162 can be repetitively carried out.

The pressing unit 160 may prevent dust from being scattered during discharging of the dust, and remarkably reduce possibility that the dust is to be discharged to an unexpected place.

It will be understood by those skilled in the art which the present invention belongs to that the present features can be embodied in several forms without departing from the ideas or essential characteristics thereof. Therefore, the detailed description should not be limitedly construed but considered as illustrative in every aspect, and thus all changes and modifications that fall within the metes and bounds of the claims, or equivalents of such metes and bounds are therefore intended to be embraced by the appended claims.

The invention claimed is:

1. A vacuum cleaner comprising: a dust collector;
an outer case forming a lateral appearance of the dust collector, and provided with a first cyclone unit capable of filtering out dust from air introduced from outside and allowing an introduction of the dust-filtered air therein; and
an upper case coupled to an upper portion of the outer case to cover the first cyclone unit, the upper case including a second cyclone unit capable of separating fine dust from the air introduced into the first cyclone unit, and a fine dust collecting unit capable of collecting the fine dust separated through the second cyclone unit,
wherein the second cyclone unit includes a left cyclone portion and a right cyclone portion disposed at both left and right sides of the fine dust collecting unit and each having outlets, each of the outlets communicating with an inside of the fine dust collecting unit,
wherein the fine dust collecting unit is provided above the first cyclone unit, and
wherein the left cyclone portion is inclined with respect to the fine dust collecting unit in a first direction, and the right cyclone portion is inclined with respect to the fine dust collecting unit in a second direction opposite the first direction wherein each of the left cyclone portion and the right cyclone portion includes a first row of cyclones and a second row of cyclones, and wherein an angle between cylindrical axes of the first and second row of cyclones in each of the left cyclone portion and the right cyclone portion is greater than 0°.

2. The vacuum cleaner of claim 1, wherein each of the left cyclone portion and the right cyclone portion includes a plurality of cyclones arranged in horizontal and vertical directions.

3. The vacuum cleaner of claim 2, wherein an empty space between the plurality of cyclones forms an introduction passage communicating with inlets of the plurality of cyclones, respectively, such that the air introduced into the first cyclone unit is introduced into each of the inlets.

4. The vacuum cleaner of claim 2, wherein one of the plurality of cyclones is disposed on another cyclone, and
wherein an inlet of each of the plurality of cyclones extends to a space formed between the one cyclone and the another cyclone.

5. The vacuum cleaner of claim 2, further comprising:
a cover member disposed to cover openings of the plurality of cyclones, respectively, and provided with vortex finders communicating with openings such that the fine dust-separated air is discharged; and
an upper cover disposed to cover the upper case, and provided with a discharge guide communicating the vortex finders with an exit of the dust collector.

6. The vacuum cleaner of claim 1, wherein the fine dust collecting unit communicates with a fine dust storage unit provided in the outer case.

7. The vacuum cleaner of claim 6, wherein the first cyclone unit comprises:
an inner housing communicating with an entrance of the dust collector through which air is introduced; and
a mesh filter disposed in the inner housing and capable of separating dust from the air introduced into the inner housing.

8. The vacuum cleaner of claim 7, wherein the inner housing comprises:
a first part surrounding the mesh filter and spaced apart from the upper case such that dust is dischargeable; and
a second part connecting the entrance of the dust collector to the first part, and extending toward an inner circumference of the first portion so as to generate a rotational flow of air introduced into the first part.

9. The vacuum cleaner of claim 8, wherein a partition plate is provided in an annular space between the outer case and the inner housing, wherein the partition plate is disposed to cover at least part of the annular space and has an opening at one portion thereof such that dust filtered out through the first cyclone unit is introduced into a preset area of a dust storage unit disposed below the partition plate.

10. The vacuum cleaner of claim 6, wherein the dust filtered out through the first cyclone unit is collected in a dust storage unit, the dust storage unit provided within the outer case in a manner of being independent of the fine dust storage unit, and
wherein a lower cover is provided at a lower portion of the outer case, wherein the lower cover forms a bottom surface of the dust storage unit and the fine dust storage unit when closed, and is capable of simultaneously opening the dust storage unit and the fine dust storage unit when opened such that the dust and the fine dust are simultaneously discharged.

11. A vacuum cleaner comprising:
a first cyclone unit provided in an outer case and capable of filtering out dust from externally-introduced air and allowing an introduction of the dust-filtered air therein;
a second cyclone unit disposed above the first cyclone unit and capable of separating fine dust from the air introduced into the first cyclone unit; and
a fine dust collecting unit capable of collecting fine dust separated through the second cyclone unit,
wherein the second cyclone unit includes a left cyclone portion and a right cyclone portion disposed at both left and right sides of the fine dust collecting unit and each having outlets, each of the outlets communicating with an inside of the fine dust collecting unit,
wherein the fine dust collecting unit is provided above the first cyclone unit, and
wherein the left cyclone portion is inclined with respect to the fine dust collecting unit in a first direction, and the right cyclone portion is inclined with respect to the fine dust collecting unit in a second direction opposite the first direction wherein each of the left cyclone portion and the right cyclone portion includes a first row of cyclones and a second row of cyclones, and wherein an angle between cylindrical axes of the first and second row of cyclones in each of the left cyclone portion and the right cyclone portion is greater than 0°.

12. A vacuum cleaner comprising: a dust collector;
a first cyclone provided within an outer case and configured to filter out a first foreign substance from externally-introduced air;
an upper case provided above the first cyclone and configured to separate a second foreign substance from the air that has passed through the first cyclone; and
a manifold provided in the upper case and configured to collect the second foreign substance,
wherein the upper case includes a first plurality of second cyclones arranged on a first side of the upper case and a second plurality of second cyclones arranged on a second side of the upper case, each of the first and second plurality of second cyclones having outlets that communicate with the manifold,
wherein the manifold is provided directly above the first cyclone, and
wherein the first plurality of second cyclones is inclined with respect to the manifold in a first direction, and the second plurality of second cyclones is inclined with respect to the manifold in a second direction opposite the first direction wherein the first plurality of second cyclones includes a first row and a second row of second cyclones, and wherein an angle between cylindrical axes of the first row and the second row of second cyclones is greater than 0° and wherein the second plurality of second cyclones includes a first row and a second row of second cyclones, and wherein an angle between cylindrical axes of the first row and the second row of second cyclones is greater than 0°.

13. The vacuum cleaner of claim 12, further comprising an upper cover that covers the upper case and guides air from the first and second plurality of second cyclones to an exterior of the dust collector.

14. The vacuum cleaner of claim 12, wherein the first cyclone comprises:
an inner housing that communicates with an entrance of the dust collector through which the externally-introduced air is introduced; and
a mesh filter provided within the inner housing and configured to separate the first foreign substance from the air introduced into the inner housing.

* * * * *